US011792614B2

(12) United States Patent
Zorgui et al.

(10) Patent No.: US 11,792,614 B2
(45) Date of Patent: Oct. 17, 2023

(54) ADAPTIVE SENSOR ACTIVATION AND CONFIGURATION FOR POSITIONING

(71) Applicant: QUALCOMM Incorporated, San Diego, CA (US)

(72) Inventors: Marwen Zorgui, San Diego, CA (US); Srinivas Yerramalli, Hyderabad (IN); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/220,894

(22) Filed: Apr. 1, 2021

(65) Prior Publication Data

US 2022/0322055 A1 Oct. 6, 2022

(51) Int. Cl.
*H04W 4/38* (2018.01)

(52) U.S. Cl.
CPC ..................................... *H04W 4/38* (2018.02)

(58) Field of Classification Search
None
See application file for complete search history.

(56) References Cited

U.S. PATENT DOCUMENTS

| 9,820,255 B1* | 11/2017 | Demsey | H04W 4/021 |
| 2011/0238191 A1* | 9/2011 | Kristjansson | G06F 1/1694 |
| | | | 700/12 |
| 2013/0314278 A1* | 11/2013 | Lim | H04W 52/0254 |
| | | | 342/357.74 |
| 2015/0079906 A1* | 3/2015 | Koo | H04W 4/70 |
| | | | 455/41.2 |
| 2015/0332573 A1* | 11/2015 | Selmanovic | H04L 67/34 |
| | | | 455/457 |
| 2018/0003507 A1* | 1/2018 | Arslan | G01S 5/0263 |
| 2019/0349881 A1* | 11/2019 | Choi | G01S 5/0236 |

(Continued)

FOREIGN PATENT DOCUMENTS

| EP | 3722827 | 10/2020 |
| WO | WO 2017184040 | 10/2017 |
| WO | WO 2021028430 | 2/2021 |

OTHER PUBLICATIONS

International Search Report and Written Opinion—PCT/US2022/070294—ISA/EPO—dated Sep. 19, 2022.

*Primary Examiner* — Ernest G Tacsik
(74) *Attorney, Agent, or Firm* — Thien T. Nguyen

(57) ABSTRACT

Aspects of sensor activation or deactivation for positioning a mobile device in a wireless communication network are disclosed. These aspects include, during a positioning session between the mobile device and a location server, determining with the location server that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. Aspects further include sending, from the location server to the mobile device, a message may comprise either: instructions to activate the reporting responsive to determining the first trigger condition has been met, or instructions to deactivate the reporting responsive to determining the second trigger condition has been met.

26 Claims, 10 Drawing Sheets

(56) References Cited

U.S. PATENT DOCUMENTS

2020/0217918 A1* 7/2020 Rydén .................. G01S 5/0218
2020/0236614 A1* 7/2020 Hedberg ................ H04W 8/22
2021/0168152 A1* 6/2021 Herrema, III ....... H04L 63/1425

* cited by examiner

ADAPTIVE SENSOR ACTIVATION AND CONFIGURATION FOR POSITIONING

BACKGROUND

1. Field of Disclosure

The present disclosure relates generally to the field of wireless communications, and more specifically to location or position determination.

2. Description of Related Art

The determination of a position of a mobile device in a wireless communication network, often referred to as "positioning" of the mobile device, may be performed using any of a variety of position-determining techniques using the transmission and measurements of RF signals by the mobile device and/or Transmission Reception Points (TRPs) of the wireless communication network. Other techniques for positioning the mobile device can include techniques that may be independent of the wireless communication network, such as Global Navigation Satellite System (GNSS)-based positioning or positioning using RF beacons. "Fusing" positioning determinations with sensor data from one or more sensors of the mobile device may be a way in which the position of a mobile device can be enhanced by providing more accuracy, reliability, etc. Such fusing is typically done by the mobile device. However, providing sensor data from the mobile device to a network device for the network device to perform the fusing, for example, can result in inefficient use of bandwidth and/or processing resources.

BRIEF SUMMARY

An example method of sensor activation or deactivation for positioning a mobile device in a wireless communication network, according to this disclosure, comprises, during a positioning session between the mobile device and a location server, determining with the location server that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The method further comprises sending, from the location server to the mobile device, a message may comprise either: instructions to activate the reporting responsive to determining the first trigger condition has been met, or instructions to deactivate the reporting responsive to determining the second trigger condition has been met.

An example method of sensor activation or deactivation for positioning a mobile device in a wireless communication network, according to this disclosure, comprises, during a positioning session between the mobile device and a location server, determining, with the mobile device, that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The method further comprises sending a reporting message from the mobile device to the location server, where the reporting message either: includes sensor data from the one or more sensors responsive to determining the first trigger condition has been met, or omits sensor data from the one or more sensors responsive to determining the second trigger condition has been met.

An example location server enabling sensor activation or deactivation for positioning a mobile device in a wireless communication network, according to this disclosure, comprises a transceiver, a memory, and one or more processing units communicatively coupled with the transceiver and the memory. The one or more processing units are configured to, during a positioning session between the mobile device and a location server, determine that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The one or more processing units are also configured to send, via the transceiver to the mobile device, a message may comprise either: instructions to activate the reporting responsive to determining the first trigger condition has been met, or instructions to deactivate the reporting responsive to determining the second trigger condition has been met.

An example mobile device enabling sensor activation or deactivation for positioning a mobile device in a wireless communication network, according to this disclosure, a wireless transceiver, a memory, and one or more processing units communicatively coupled with the wireless transceiver and the memory. The one or more processing units are configured to, during a positioning session between the mobile device and a location server, determine that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The one or more processing units are also configured to send a reporting message via the wireless transceiver to the location server, where the reporting message either: includes sensor data from the one or more sensors responsive to determining the first trigger condition has been met, or omits sensor data from the one or more sensors responsive to determining the second trigger condition has been met.

An example device for sensor activation or deactivation for positioning a mobile device in a wireless communication network, according to this disclosure, comprises means for determining, during a positioning session between the mobile device and a location server, that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The device further comprises means for sending, to the mobile device, a message may comprise either: instructions to activate the reporting responsive to determining the first trigger condition has been met, or instructions to deactivate the reporting responsive to determining the second trigger condition has been met.

Another example device for sensor activation or deactivation for positioning a mobile device in a wireless communication network, according to this disclosure, comprises means for determining, during a positioning session between the mobile device and a location server, that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The device further comprises means for sending a reporting message to the location server, where the reporting message either: includes sensor data from the one or more sensors responsive to determining the first trigger condition has been met, or omits sensor data from the one or more sensors responsive to determining the second trigger condition has been met.

An example non-transitory computer-readable medium, according to this disclosure, stores instructions for sensor activation or deactivation for positioning a mobile device in a wireless communication network. The instructions comprise code for determining, during a positioning session between the mobile device and a location server, that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The instructions further comprise code for sending, from the location server to the mobile device, a message may comprise either: instructions to activate the reporting responsive to determining the first trigger condition has been met, or instructions to deactivate the reporting responsive to determining the second trigger condition has been met.

Another example non-transitory computer-readable medium, according to this disclosure, stores instructions for sensor activation or deactivation for positioning a mobile device in a wireless communication network. The instructions comprise code for determining, during a positioning session between the mobile device and a location server, that a first trigger condition or a second trigger condition has been met regarding reporting, by the mobile device to the location server, of sensor data from one or more sensors of the mobile device, where: the first trigger condition may comprise a trigger condition for activating the reporting, and the second trigger condition may comprise a trigger condition for deactivating the reporting. The instructions further comprise code for sending a reporting message from the mobile device to the location server, where the reporting message either: includes sensor data from the one or more sensors responsive to determining the first trigger condition has been met, or omits sensor data from the one or more sensors responsive to determining the second trigger condition has been met.

Figure 1:
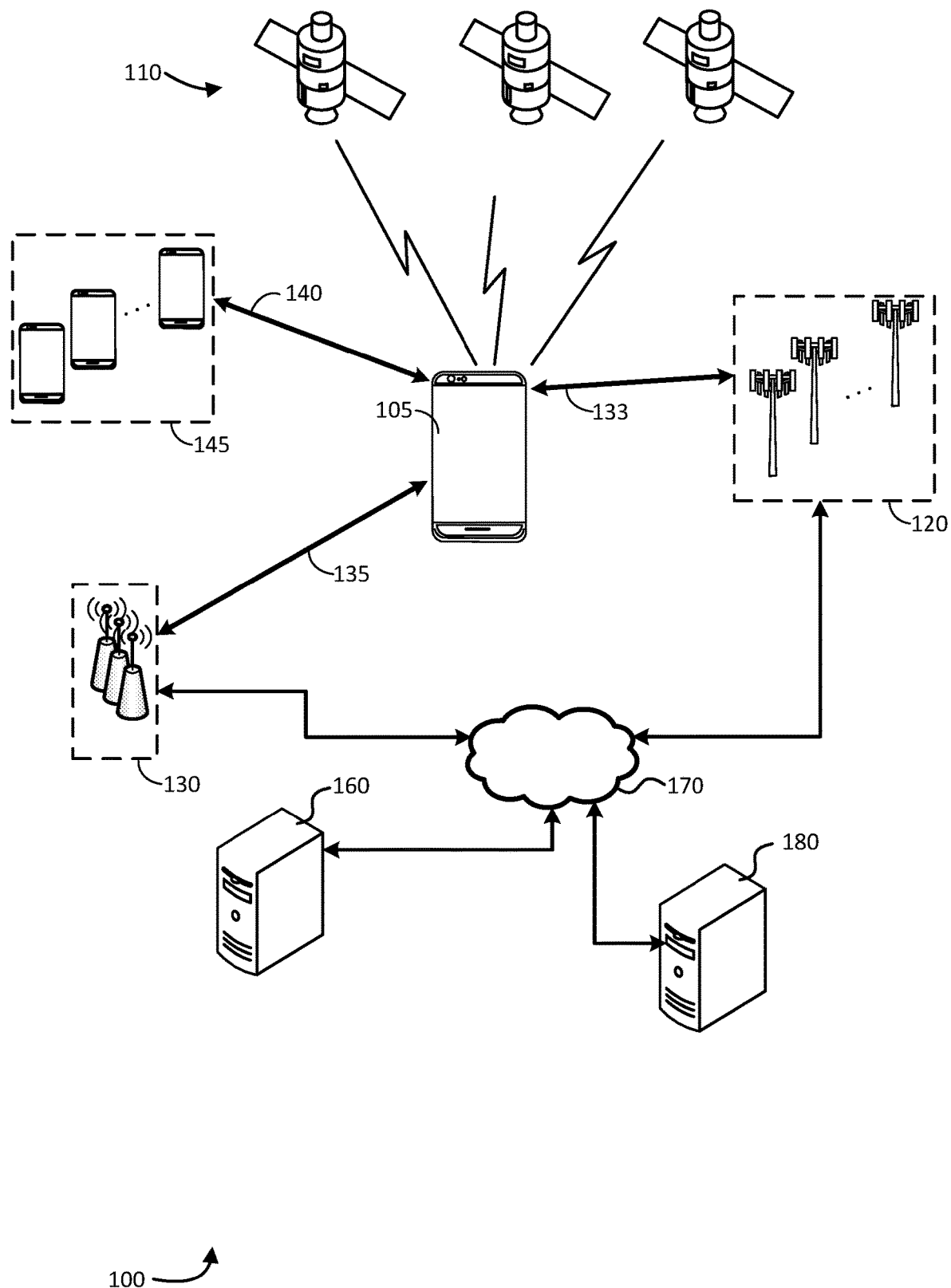
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), 5G standards, or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. Additionally, is used herein, the terms "mobile device" and "user equipment (UE)" may be used interchangeably, although it will be understood that not all UEs may necessarily be mobile.

As noted, fusing sensor data of a mobile device with one or more position determinations for the mobile device can result in an enhanced position determination of the mobile device that may be more accurate and/or reliable than a position determination that is not fused with sensor data. This can be because sensor data may serve to provide additional data in cases where sensor data is more accurate than other positioning techniques, other position techniques are suffering an outage or deterioration in accuracy, sensor data is provided more frequently (e.g., several times per second), or the like.

Traditionally, fusing sensor data of the mobile device with one or more position determinations would be performed by a mobile device. Techniques that would allow a network device (e.g., a location server) to perform the fusion generally have not been used because such techniques require the mobile device to send sensor data to the network device, which can consume RF resources. Further, such techniques can increase the energy consumption of the mobile device by activating the sensor itself and transmitting the data.

Embodiments provided herein address these and other issues by enabling a mobile device to quickly switch between different modes of operation, activating one or more sensors as needed for positioning, and deactivating them in circumstances where data from the one or more sensors may not be beneficial. Details regarding these embodiments are provided herein. First, however, a description of a wireless communication network environment is provided, for context.

Figure 2:
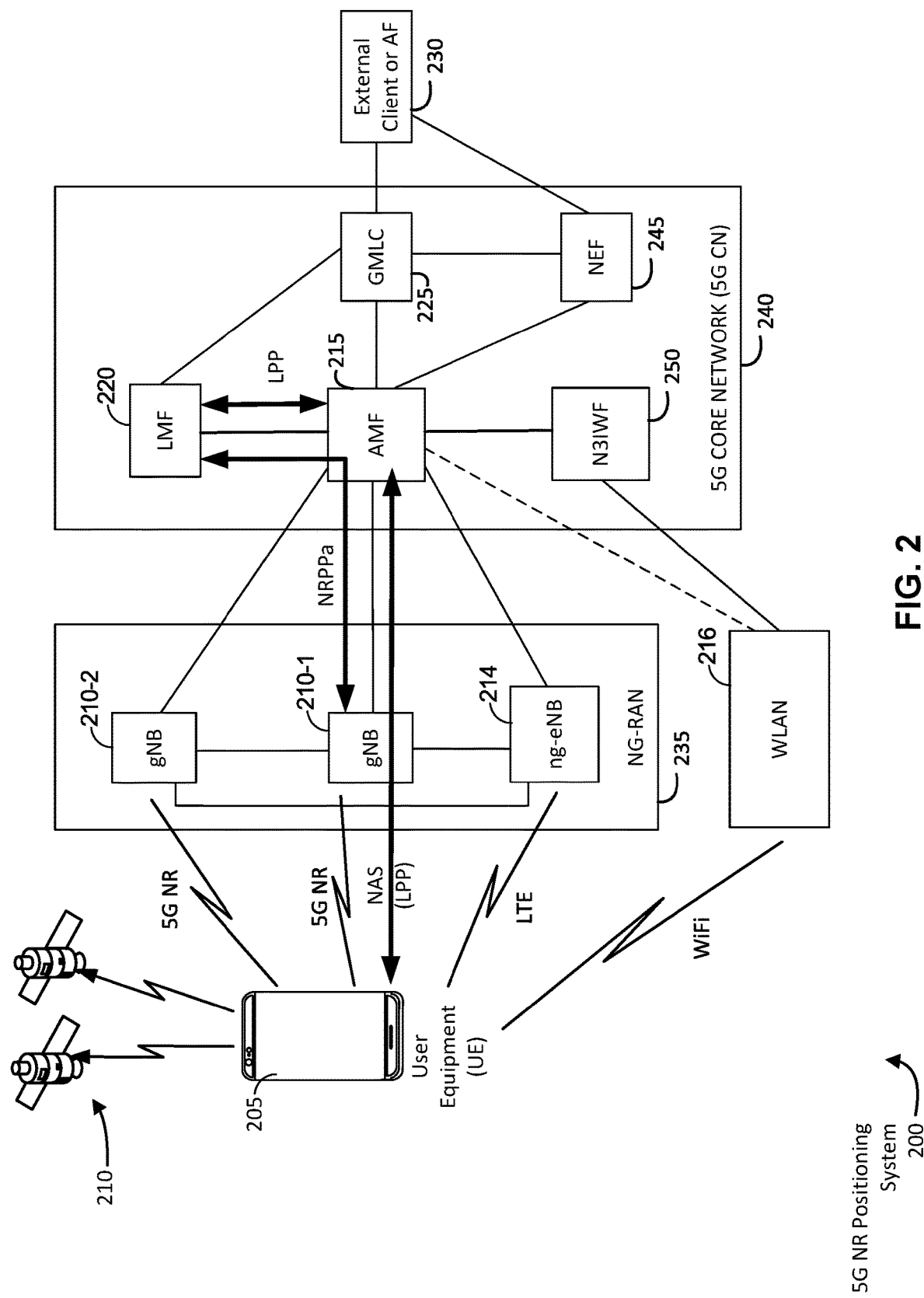
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 1 is a simplified illustration of a positioning system 100 in which a mobile device 105, location server 160, and/or other components of the positioning system 100 can use the techniques provided herein for adaptive sensor activation and configuration, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed in more detail with regard to FIG. 2. In an LTE or 5G NR network (e.g., as shown in FIG. 2), the mobile device 105 may be referred to as a user equipment (UE).

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices/UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. When or more other mobile devices 145 are used in the position determination of a particular mobile device 105, the mobile device 105 for which the position is to be determined may be referred to as the "target" or "target UE," and each of the one or more other mobile devices 145 used may be referred to as an "anchor" or "anchor UE." For position determination of a target UE, the respective positions of the one or more anchor UEs may be known and/or jointly determined with the target UE. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location or some other location such as a location for mobile device 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, asset tracking or child or pet location). Additionally or alternatively, the external client 180 may obtain and provide the location of mobile device 105 to an emergency services provider, government agency, etc.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 205 (which may correspond to the mobile device 105 of FIG. 1) by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 205, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), tracking device, navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like the one or more RATs, and as previously noted with respect to FIG. 1) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to external client 180 of FIG. 1, as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). Access to the 5G network is provided to UE 205 via wireless communication between the UE 205 and one or more of the gNBs 210, which may provide wireless communications access to the 5G CN 240 on behalf of the UE 205 using 5G NR. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 205) and/or obtain downlink (DL) location measurements from the UE 205 that were obtained by UE 205 for DL signals received by UE 205 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node 210, 214, or 216 of a first RAT to an access node 210, 214, or 216 of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol A (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AOD, and/or ECID. The NRPPa protocol may be used to support positioning of UE 205 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

In a 5G NR positioning system 200, positioning methods can be categorized as being "UE assisted" or "UE based." This may depend on where the request for determining the position of the UE 205 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 205 may obtain location measurements and send the measurements to a location server (e.g., LMF 220) for computation of a location estimate for UE 205. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 205 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 205 may obtain location measurements (e.g., which may be the same as or similar to location measurements for a UE assisted position method) and may further compute a location of UE 205 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 205, and/or may receive measurements obtained by UE 205 or by an AP in WLAN 216 in the case of N3IWF 250, and may send the measurements to a location server (e.g., LMF 220) for computation of a location estimate for UE 205.

Positioning of the UE 205 also may be categorized as UL, DL, or DL-UL based, depending on the types of signals used for positioning. If, for example, positioning is based solely on signals received at the UE 205 (e.g., from a base station or other UE), the positioning may be categorized as DL based. On the other hand, if positioning is based solely on signals transmitted by the UE 205 (which may be received by a base station or other UE, for example), the positioning may be categorized as UL based. Positioning that is DL-UL based includes positioning, such as RTT-based positioning, that is based on signals that are both transmitted and received by the UE 205. Sidelink (SL)-assisted positioning comprises signals communicated between the UE 205 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

As previously noted, the positioning of a mobile device (e.g., mobile device 105 and/or UE 205) can be made using a variety of positioning methods. As used herein, the terms "RAT-dependent" or "RAT-based" positioning generally refers to SL, UL, DL, or DL-UL based positioning within a data communication network, as described above. Other forms of positioning, referred to herein as "RAT-independent" positioning can include other forms of positioning, including GNSS-based positioning, sensor-based positioning, and/or positioning using RF signals from Bluetooth (and/or other RF) beacons, WLAN, etc. As further noted, sensor "fusion"—or the fusion of sensor data from the mobile device with one or more of these positioning techniques—can improve the positioning performance of traditional positioning techniques. A more detailed indication of the types of data that can be fused to provide this enhanced positioning determination for the mobile device is provided in FIG. 3

Figure 3:
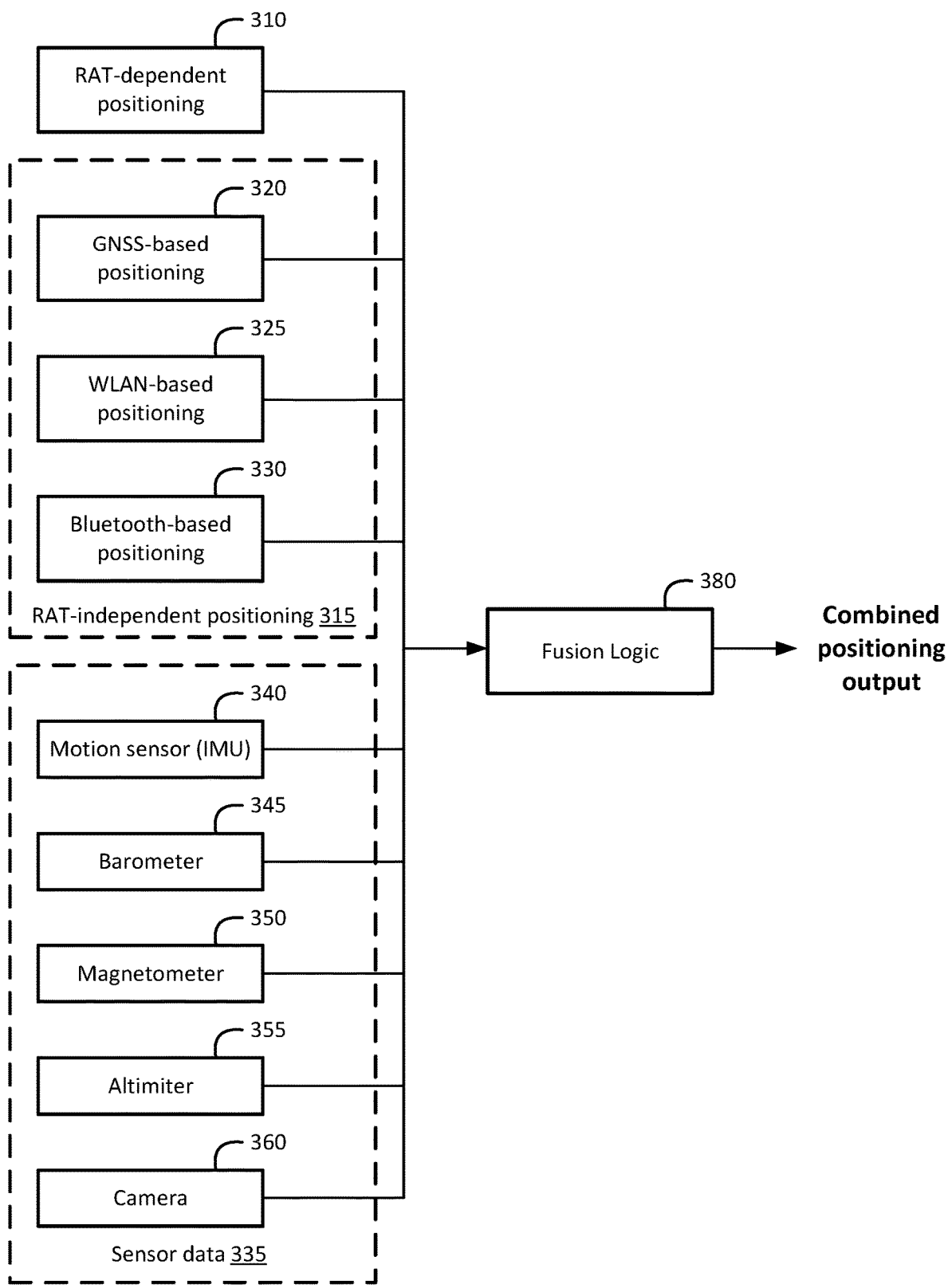
FIG. 3 is a diagram illustrating how data from a variety of data sources can be fused to provide a combined positioning output for a mobile device.

FIG. 3 is a block diagram illustrating the types of data that can be used to provide an enhanced positioning determination, according to embodiments. Here, blocks 310-360 indicate various data sources, many or all of which may be retrieved from hardware and/or software components of the mobile device, as indicated in further detail below. Alternative embodiments may include additional or alternative data sources, depending on desired functionality.

RAT-dependent positioning 310 may comprise a position determination of the mobile device using the SL, UL, DL, or DL-UL based positioning within a data communication network as described above. For UE-based positioning, the position of the mobile device may be determined by the mobile device itself, in which case the mobile device itself can serve as the source of the RAT-dependent positioning 310. For UE-assisted positioning, the position of the mobile device may be determined by a network device, such as a location server, in which case the network device may serve as the source of the RAT-dependent positioning 310.

RAT-independent positioning 315, as previously indicated, may comprise one or more different types of positioning that may be independent of the wireless case network. This may include GNSS-based positioning 320, WLAN-based positioning 325, and/or Bluetooth-based positioning 330. Each positioning type may provide its own position determination of the mobile device and may be executed by the mobile device itself. Some forms of RAT-independent positioning 315 (e.g., standard GNSS-based positioning 320 and/or Bluetooth-based positioning 330 using Bluetooth beacons) may be performed by the mobile device without communicating to any other devices. Additionally or alternatively, some forms of RAT-independent positioning 315 (e.g., GNSS-based positioning 320 using Real-Time Kinematic (RTK) correction, WLAN-based positioning 325 using RTT-based measurements, and the like) may involve the mobile device communicating with other devices.

Sensor data 335 may be extracted from any of a variety of sensors of the mobile device, as illustrated in FIG. 3. Alternative embodiments may include additional or alternative types of sensors, depending on desired functionality. Is illustrated, sensor data 335 can include data a motion sensor 340 (e.g., inertial measurement unit (IMU)), barometer 345, magnetometer 350, altimeter 355, and/or camera 360. Depending on desired functionality, sensor data 335 provided to the fusion logic 380 may comprise raw sensor data and/or data derived therefrom. In some embodiments, for example, sensor data 335 may include and absolute or relative position, a displacement in one or more directions (e.g., during a time window and/or from a previous point in time), a change in orientation (e.g., a rotation), an acceleration, and the like.

Fusion logic 380 may comprise a positioning engine capable of providing a combined positioning output using multiple sources of data, including one or more positioning methods (e.g., RAT-dependent positioning 310 and/or RAT-independent positioning 315), as well as sensor data 335 from one or more sensors. Different weighting techniques may be used when determining how to use each input, where more weight can be given to more reliable and/or accurate sources, for example. In some embodiments, the fusion logic 380 may comprise an Extended Kalman Filter (EKF) and/or other Kalman filter, Weighted Least Squares (WLS), a hatch filter, particle filter, or the like. Fusion logic 380 may be executed, for example, in software by one or more processing units.

As noted, the mobile device itself may execute the fusion logic 380 to provide the combined positioning output for UE-based positioning, in which case the mobile device determines its own position. However, for UE-assisted positioning, in which case a location server determines the location of the mobile device, sending sensor data from the mobile device to the location server can result in inefficiencies. This is discussed in further detail below with regard to FIG. 4.

Figure 4:
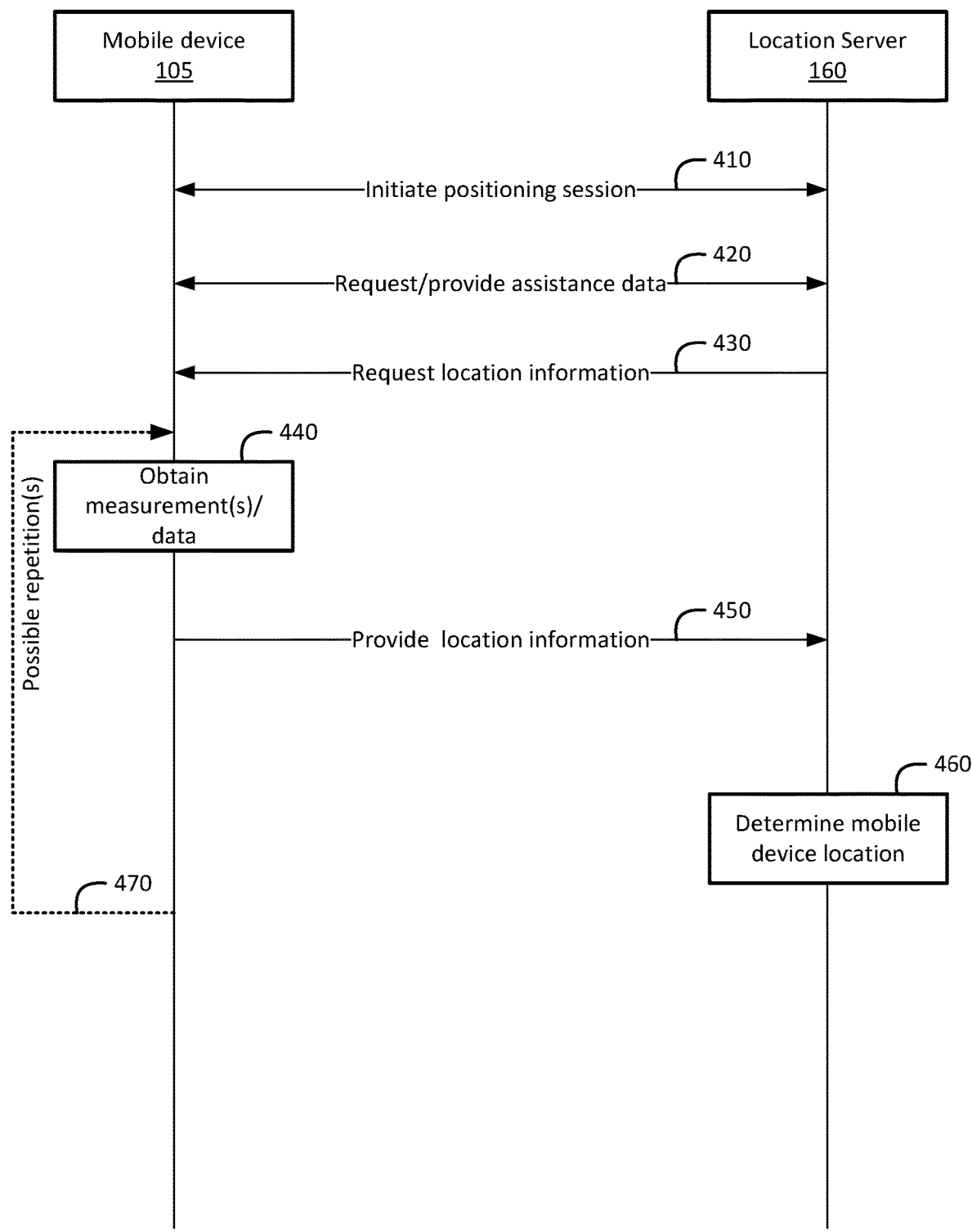
FIG. 4 is a call flow diagram illustrating a communication exchange that may occur during a positioning session between a mobile device and a location server, according to an embodiment.

FIG. 4 is a call-flow diagram that illustrates a basic exchange of assistance data (AD) and reporting between a mobile device 105 (e.g., UE 205) and location server 160 (e.g., LMF 220) during a positioning session for UE-assisted positioning, according to an embodiment. This can represent, for example, an LPP positioning session between the mobile device 105 and location server 160, although embodiments are not necessarily limited to LPP positioning. Further, it will be understood that additional information may be exchanged, depending on the type of positioning performed, protocol used, and/or other factors.

Arrow 410 indicates the positioning session between the mobile device 105 and location server 160 being initiated. For UE-assisted positioning of the mobile device 105, the location server 160 may contact the mobile device 105 to initiate the positioning session. Preliminary information such as capabilities of the mobile device 105 and/or location server 160 also may be exchanged. The initiation of the positioning session at arrow 410 may further indicate the types of positioning to be performed, which may be based on capabilities. This may include positioning types for which measurement information taken by the mobile device 105 is to be reported back to the location server 160. Such positioning types can include, for example, multi-RTT positioning, DL-AoD positioning, DL-TDOA positioning, Enhanced Cell ID (E-CID) positioning, and/or UL positioning.

For instances in which the mobile device 105 may need configuration information regarding reference signals (e.g., PRS resources), the location server 160 may provide assistance data to the mobile device 105, which may be in response to the mobile device's request for the assistance data. This exchange is indicated by double arrow 420.

Location server 160 may then request location information, as indicated at arrow 430. The location information may include measurements taken of PRS resources identified in the assistance data and/or other location-related data, which are obtained by the mobile device 105 as indicated at block 440. These measurement(s)/data are included in the location information sent from the mobile device 105 to the location server 160, as indicated by arrow 450. (More generally, a message from the mobile device 105 to a location server that includes measurement(s)/data may be referred to herein as a "report" or "measurement report.") Using this information, the location server 160 then determines the mobile device location, as indicated at block 480.

As further indicated by arrow 470, functions 440, 450, and 460 may be repeated during the positioning session. That is, during a given positioning session, the mobile device 105 may repeat the process of obtaining and providing the measurements/data, which it may do with a configured repetition rate/periodicity. For its part, the location server 160 can update a calculated position of the mobile device 105 correspondingly. Depending on desired functionality, the location server 160 may determine a single device location, or may determine multiple device locations (e.g., updated locations) based on these repetitions. According to some embodiments, additional assistance data exchanges and/or location information requests may also occur during a positioning session between the mobile device 105 and location server 160.

Sensor data can be provided by the mobile device 105 to the location server 160 (e.g., in a send location information message, and/or other message) to enable the location server to determine and enhanced mobile device location by fusing sensor data with other location information. However, traditional techniques for enabling reporting of sensor data in a location session between a mobile device 105 and location server 160 have no way of deactivating reporting of sensor data over the course of a positioning session. Instead, the reporting of sensor data, if activated, is reported by the mobile device throughout the positioning session (e.g., with every repetition of the provide location information message at arrow 450) regardless of whether the sensor data remains useful or not. As previously noted, the transmittal of sensor data can consume RF resources, and the use of the sensors and reporting of sensor data can increase power consumption by the mobile device 105. Thus, if sensor data is inaccurate or erroneous, it may incur these drawbacks without providing the added benefit of enhanced mobile device location.

To address these and other issues, embodiments provide for adaptive sensor activation and deactivation in which the mobile device 105 and/or the location server 160 may activate and deactivate sensor data reporting by the mobile device 105. Switching between these modes of operation (active and inactive) can be done quickly, during a positioning session between the mobile device 105 and location server 160. Accordingly, the mobile device 105 and/or the location server 160 can dynamically activate and deactivate sensor data reporting by the mobile device 105 as needed to accommodate changing conditions that may impact a position determination of the mobile device during a positioning session. Specifically, in cases where sensor data may not provide the benefit of enhancing the position determination of the mobile device 105, sensor data reporting by the mobile device 105 can be deactivated, saving RF resources and battery consumption of transmitting this data. Furthermore, the mobile device can deactivate the sensors themselves if they are not otherwise being used by any other function of the mobile device.

The activation or deactivation of sensor reporting by the mobile device 105 can be done through messaging between the location server 160 and mobile device 105. According to some embodiments, the location server 160 may determine to activate or deactivate sensor data reporting, in which case the location server 160 can provide a message with instructions to the mobile device 105 to activate or deactivate the sensor data reporting. Additionally or alternatively, the mobile device 105 may determine whether to activate or deactivate sensor data reporting, in which case the mobile device 105 may send a request in a message to the location server 160 to perform the activation/deactivation, and/or a notice to the location server 160 of the activation/deactivation. Such messages between the location server 160 and the mobile device 105 may be conveyed during a positioning session such as the one illustrated in FIG. 4. According to some embodiments, for example, activation and/or deactivation may occur while the mobile device is obtaining and reporting measurement(s)/data (e.g., repeating operations 440-450). In some implementations, this may be in addition to an initial activation or deactivation at the beginning of the positioning session. For example, after initially receiving the capabilities of the mobile device 105 when initiating the positioning session (arrow 410), the location server 160 may instruct the mobile device 105 to activate sensor data reporting (e.g., when requesting location information at arrow 430). Additional details regarding embodiments in which the location server or the mobile device determine activation and/or deactivation are provided hereafter with regard to FIGS. 5-8.

Figure 5:
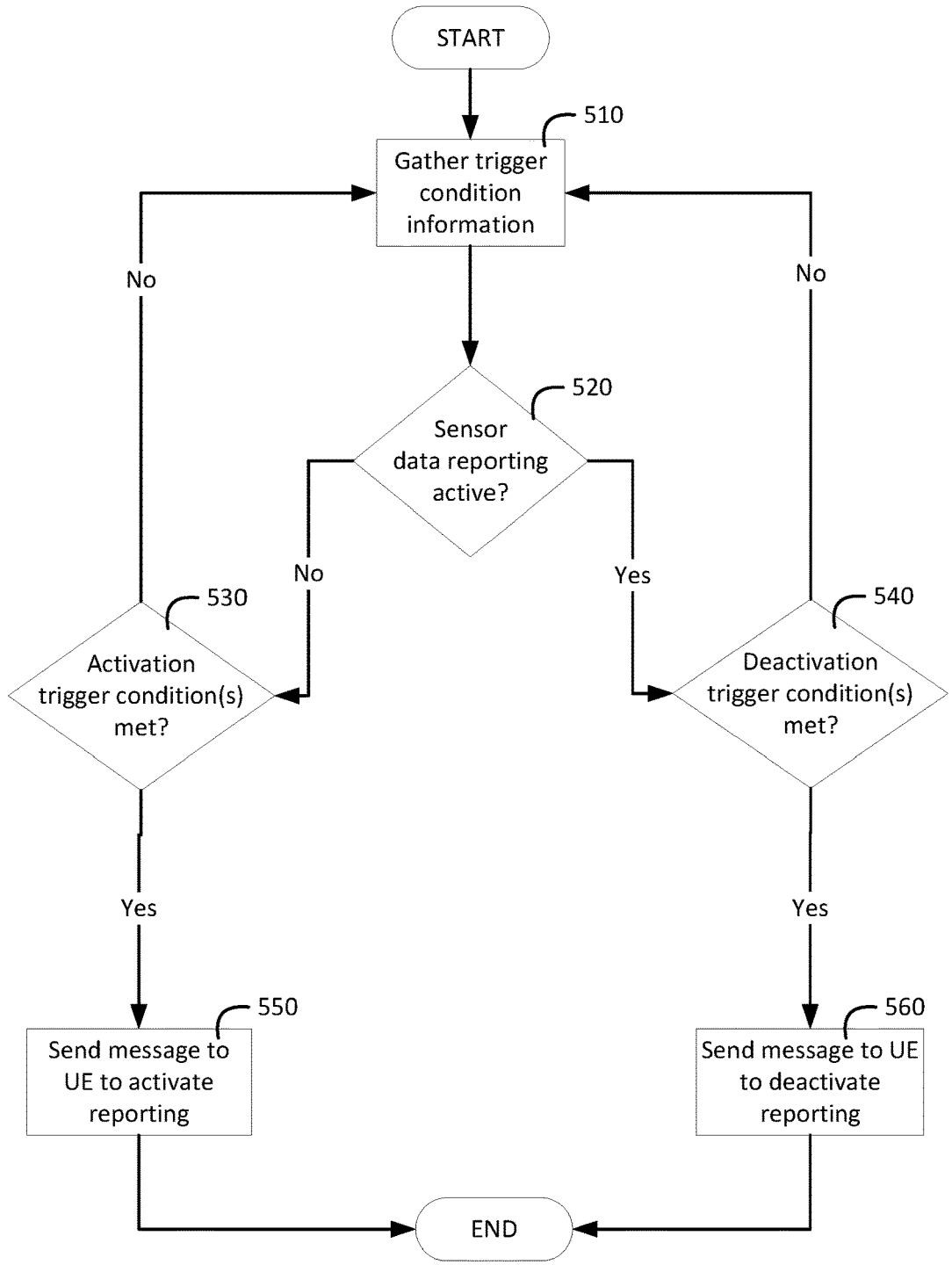
FIG. 5 is a flow chart illustrating an example logical flow that may be executed by a location server to provide adaptive sensor activation and configuration for positioning, according to an embodiment.

FIG. 5 is a flowchart that illustrates an example logical flow that could be executed by a location server to activate and/or deactivate mobile device sensor data reporting, according to an embodiment. As noted, this may be performed during the course of a positioning session with the mobile device, such as the positioning session illustrated in FIG. 4, at the beginning of the positioning session (e.g., to initially activate or deactivate sensor data reporting) and/or during a period of time in which the mobile device is providing periodic reporting of location information.

The process can begin with the functionality at block 510, in which trigger condition information is gathered. As previously noted, the conditions during which sensor data can be used to provide enhanced positioning of the mobile device can vary. And thus, gathering trigger condition information may comprise gathering information regarding these conditions. Generally speaking, conditions in which the sensor data may be useful will trigger activation of sensor data reporting, and conditions in which the sensor data may not be useful will trigger deactivation of sensor data reporting. Thus, as described in further detail below, trigger condition information may comprise information regarding accuracy of sensor data from the mobile device, accuracy and/or uncertainty of a position determination of the mobile device, and/or conditions that could have an impact on these accuracy measurements (e.g., sensor errors, signal quality, etc.).

At block 520, the functionality comprises determining whether the sensor data reporting is active. As illustrated, this impacts which logical branch the location server follows to determine whether to switch from a current operational mode to the other. If sensor data reporting is not active, the location server then determines whether one or more trigger conditions for activating the sensor data reporting are met, as indicated at block 530. Otherwise, if sensor data reporting is active, the location server then determines whether one or more trigger conditions for deactivating the sensor data reporting are met, as indicated at block 540.

The trigger condition(s) for activating sensor data reporting (considered at block 530) may vary, depending on desired functionality. For example, if an estimated position of the mobile device by the location server has a relatively large uncertainty, or relatively low accuracy, sensor data reporting can improve performance by reducing uncertainty/increasing accuracy. The uncertainty or accuracy of the position determination, which may be reflective of a quality or accuracy of measurements used to make the position determination, is often determined as a matter of course when the position determination is made. This uncertainty value exceeding a threshold (or an accuracy value dropping below a threshold) may itself be a trigger condition for activating sensor data reporting or may be one of many factors considered when activating sensor data reporting.

For RAT-dependent positioning of the mobile device, poor quality RF signals used for positioning of the mobile device can result in an inaccurate position determination of the mobile device. For example, for RF signals measured by the UE for positioning (e.g., DL-PRS transmitted by one or more TRPs), the UE may provide RF signal quality (e.g., an SNR value) of the one or more RF signals to the location server. Additionally or alternatively, for RF signals transmitted by the UE for positioning (e.g. SRS), one or more TRPs that measure the transmitted RF signals may provide RF signal quality of the one or more RF signals to the location server. Thus, in some embodiments, a signal quality metric falling below a threshold be a trigger condition for activating sensor data reporting or may be one of many factors considered when activating sensor data reporting.

The frequency of sensor sampling and/or reporting may also be considered for triggering activation of the sensor data reporting. For example, positioning signals for RAT-dependent positioning are relatively infrequent, having a periodicity of 160 ms, for example. On the other hand, the sampling of sensor data by the mobile device may be far more frequent, occurring every 10 ms or less, for example. Thus, sensor data can be used to help interpolate/estimate RAT-dependent position determinations that occur less frequently, providing better intermediate position fixes. The reporting of this sensor data by the mobile device may occur at the same frequency of the sampling or may occur at a slower frequency. In the latter case, sensor data may be accumulated (with corresponding timestamps) and sent in batches. Either way, according to some embodiments, a frequency of sensor sampling surpassing a threshold and/or a frequency of other positioning techniques falling below a threshold may be trigger conditions for activating sensor data reporting or may be factors considered when activating sensor data reporting.

The trigger conditions for deactivating sensor data (considered at block 540) reporting may vary, depending on desired functionality. According to some embodiments, they may echo the trigger conditions for activating the sensor data, but in reverse. That is, if trigger conditions for activating the sensor data reporting are no longer met, it may trigger deactivation of the sensor data reporting. Thus, trigger conditions for deactivating sensor data reporting may comprise, for example, (i) an uncertainty value of a mobile device position estimation falling below a threshold (or an accuracy value exceeding a threshold), (ii) a signal quality metric (e.g., an SNR value) exceeding a threshold, (iii) a frequency of sensor sampling surpassing a threshold, (iv) a frequency of other positioning techniques falling below a threshold, or (v) any combination thereof.

According to some embodiments, a determination that sensor data is erroneous additionally or alternatively may be used as a trigger condition for deactivating sensor data. That is, sensor data may be determined to be erroneous when compared with position fixes obtained using other measurements (e.g., RF measurements). For example, if sensor data indicates a large amount of movement of the mobile device and position fixes and/or other data (that may have low uncertainty and/or high accuracy) does not indicate a large amount of movement, it may be indicative of erroneous sensor data. In such instances, a sensor data error may be a trigger condition for deactivating sensor data reporting or may be one factor of many considered when deactivating sensor data reporting.

The functionality at blocks 550 and 560 comprise sending a message to the UE to activate or deactivate sensor data reporting, respectively. This may be provided, for example, by the location server via LPP messaging (e.g., using a Radio Resource Control (RRC) message). Moreover, in some embodiments, the message may comprise an existing LPP message, such as a message for requesting capabilities, requesting sensor data, delivering assistance data, requesting location information, aborting an LPP procedure, or the like. That said, alternative embodiments may utilize other types of messaging (e.g., non-LPP messaging) for faster activation/deactivation. According to some embodiments, for example, the message sent to the mobile device may be sent via Media Access Control-Control Element (MAC-CE) and/or Downlink Control Information (DCI).

It can be noted that the activation or deactivation of sensor data reporting may apply to different subsets of sensors: e.g., a single sensor, a group of sensors, or all (relevant) sensors of the mobile device. If, for example, data from a single sensor is determined to be erroneous (e.g., in view of data from other sensors and/or position determinations), reporting for that sensor may be deactivated. Thus, the message sent at block 550 or block 560 may include an indication of which sensor(s) to activate or deactivate, respectively.

As indicated in FIG. 5, the process may end after the message is sent. That said, the process illustrated in FIG. 5 may be repeated as noted throughout the positioning session to adaptively activate/deactivate sensor data reporting. In some embodiments, for example, the process may be initiated at the beginning of a positioning session and repeated until the positioning session is finished. Additionally or alternatively, certain triggers within the positioning session may because the location server to execute (or re-execute) the process in FIG. 5. These triggers may comprise an indication by the mobile device of a capability for sensor data reporting, an indication that sensor data reporting has been activated/deactivated, an indication for a need for enhanced positioning of the mobile device, and the like.

As noted, in addition or as an alternative to the location server determining whether to activate or deactivate sensor data reporting, a mobile device may make the determination. An example of how a mobile device may perform this functionality is illustrated in FIG. 6 and described below.

Figure 6:
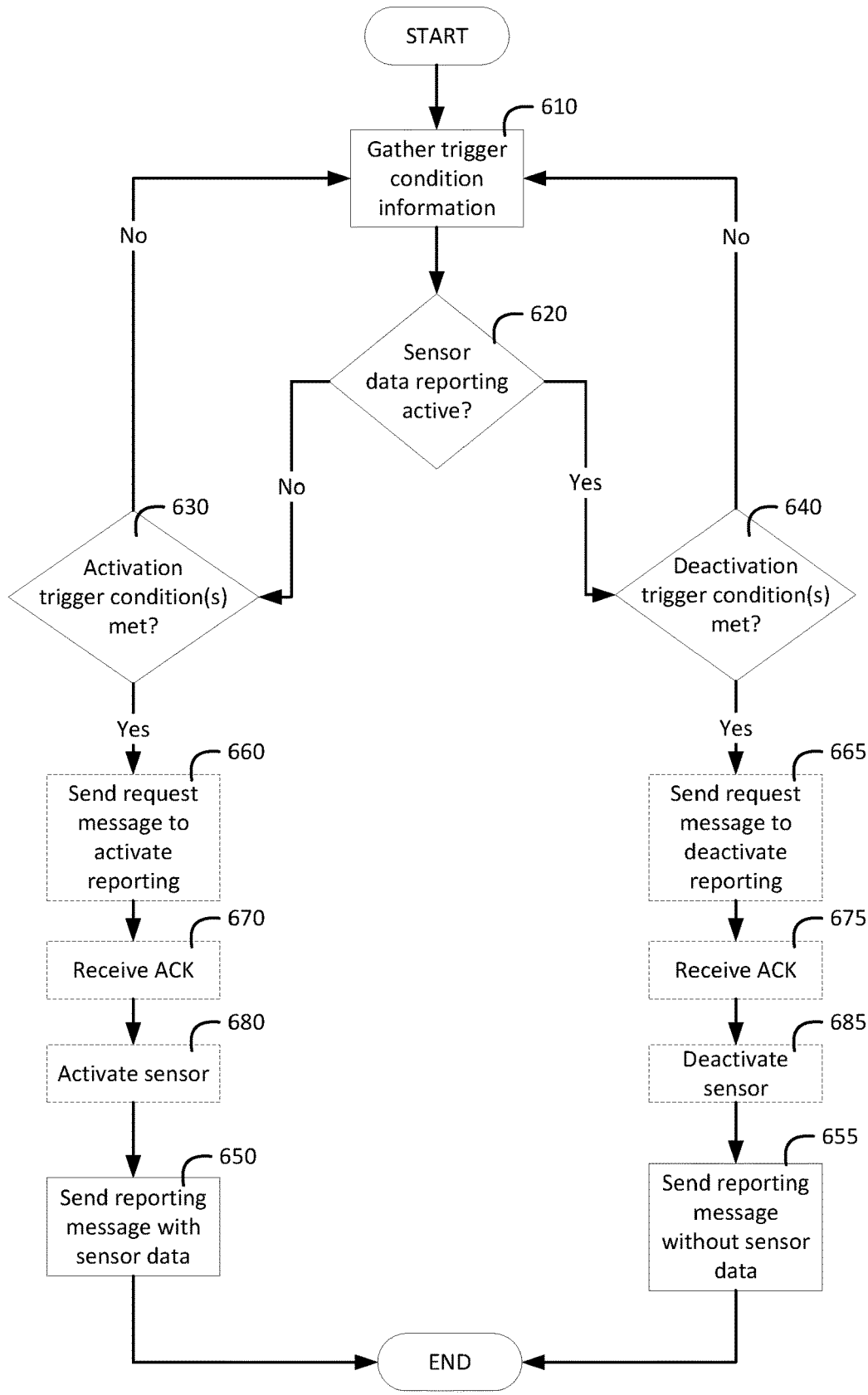
FIG. 6 is a flow chart illustrating an example logical flow that may be executed by a mobile device to provide adaptive sensor activation and configuration for positioning, according to an embodiment.

FIG. 6 is a flowchart that illustrates an example logical flow that could be executed by a mobile device to activate and/or deactivate mobile device sensor data reporting, according to an embodiment. Again, this may be performed during the course of a positioning session with the mobile device, such as the positioning session illustrated in FIG. 4, at the beginning of the positioning session (e.g., to initially activate or deactivate sensor data reporting) and/or during a period of time in which the mobile device is providing periodic reporting of location information.

Generally put, the functions at blocks 610-640 may largely echo corresponding functions at blocks 510-540 of FIG. 5. That said, there may be some differences, given differences in the data available to the mobile device and the location server. In addition or as an alternative to the triggering conditions discussed with regard to FIG. 5 considered by the location server, the mobile device may consider other triggering conditions at blocks 630 and 640 for activating or deactivating sensor data reporting, respectively.

According to some embodiments power considerations may be considered by the mobile device one activating or deactivating sensor data reporting. For example, if the battery of the mobile device is relatively low and the mobile device determines that any potential enhancement of a position estimation of the mobile device that may be gained from reporting sensor data (which may include activating the sensor) may not be worth the additional power draw from the battery, the mobile device may deactivate sensor data reporting from one or more sensors, or may only activate sensor data reporting of sensors that draw a relatively low amount of power. Thus, in some embodiments, a battery power level falling below a threshold be a trigger condition for deactivating sensor data reporting or may be one of many factors considered when deactivating sensor data reporting.

According to some embodiments, a quality of sensor data additionally or alternatively may be considered by the mobile device. For example, the mobile device may determine that a sensor data quality of service (QOS) is not reliable anymore based on the sensor generating atypical small-scale variations in measurement, or the like. In such instances, the sensor may need to be restarted, may be out of tune, or otherwise can no longer be used reliably. Thus, in some embodiments, a sensor accuracy metric falling below a threshold be a trigger condition for deactivating sensor data reporting or may be one of many factors considered when deactivating sensor data reporting.

If the mobile device determines that an activation trigger condition is met at block 630, it may then activate sensor data reporting by sending reporting message with the sensor data, as indicated at block 650. Conversely, if the mobile device determines that a deactivation trigger condition is met at block 640, it may then deactivate sensor data reporting by sending reporting message without the sensor data, as indicated at block 650. Again, the trigger conditions and reporting may apply to a subset of available sensors, depending on desired functionality. In other words, sensor activation/deactivation may occur on a per-sensor level, may apply to a group of sensors, or may apply to all available sensors, which may depend on the trigger condition(s) met.

As indicated by the dashed blocks in FIG. 6, alternative embodiments may include one or more optional functions. For example, according to some embodiments, the mobile device may first send a request message to the location server to activate/deactivate sensor data reporting prior to activation/deactivation, as indicated at blocks 660 and 665. Moreover, the mobile device may abstain from activating/deactivating sensor data reporting until it receives an acknowledgment (ACK) from the location server, as indicated at blocks 670 and 675. Finally, activating/deactivating sensor data reporting of one or more sensors may comprise activating/deactivating the sensors themselves, as indicated at blocks 680 and 685. A mobile device may activate/deactivate the one or more sensors, for example, in cases where the one or more sensors are not otherwise being used by other functions of the mobile device.

According to some embodiments, messages sent to the location server may comprise LPP messaging. That said, similar to the process illustrated in FIG. 5, other embodiments may leverage faster means. For example, according to some embodiments, one or more of the message is sent from the mobile device to the location server may be sent via PUSCH, PUCCH, Uplink Control Information (UCI), or a combination thereof.

Referring again to the trigger condition determinations at blocks 630 and 640, this may be further influenced by a configuration received from the location server. That is, according to some embodiments, the server may configure the mobile device with conditions for sensor data activation/deactivation. These conditions may include, for example, RF measurement quality thresholds (e.g., a threshold on RSRP, SNR, etc.), sensor data quality thresholds (e.g., a threshold of QOS of one or more sensors), or the like. Thus, although the mobile device may make the determination of whether to activate/deactivate sensor data reporting, the location server can provide thresholds to the mobile device for doing so, thereby enabling the location server to opportunistically/adaptively leverage sensor data to accommodate different conditions that may impact the position determination quality at the network. It can be further noted that, by setting these thresholds extremely high or extremely low, the location server can effectively turn sensor data reporting on or off. Again, this messaging may be sent via RRC, MAC-CE, or DCI, for example. In some embodiments, for example, the location server may provide the thresholds/configuration via RRC messaging, and activation/deactivation by the location server and/or mobile device can be managed via MAC-CE or DCI/UCI messaging.

According to some embodiments, an indication that an activation/deactivation trigger condition has been met may be provided in a message to the location server. This can be included, it for example, in the request messages at blocks 660 and 665 and/or reporting at block 650 and 655. In some embodiments, this may simply be a flag (e.g., a single bit) indicating that sensor data reporting has been activated or deactivated. In some embodiments, the mobile device may optionally include a reason for the activation/deactivation by indicating, for example, a certain threshold has been met for activation/deactivation, or the like.

Figure 7:
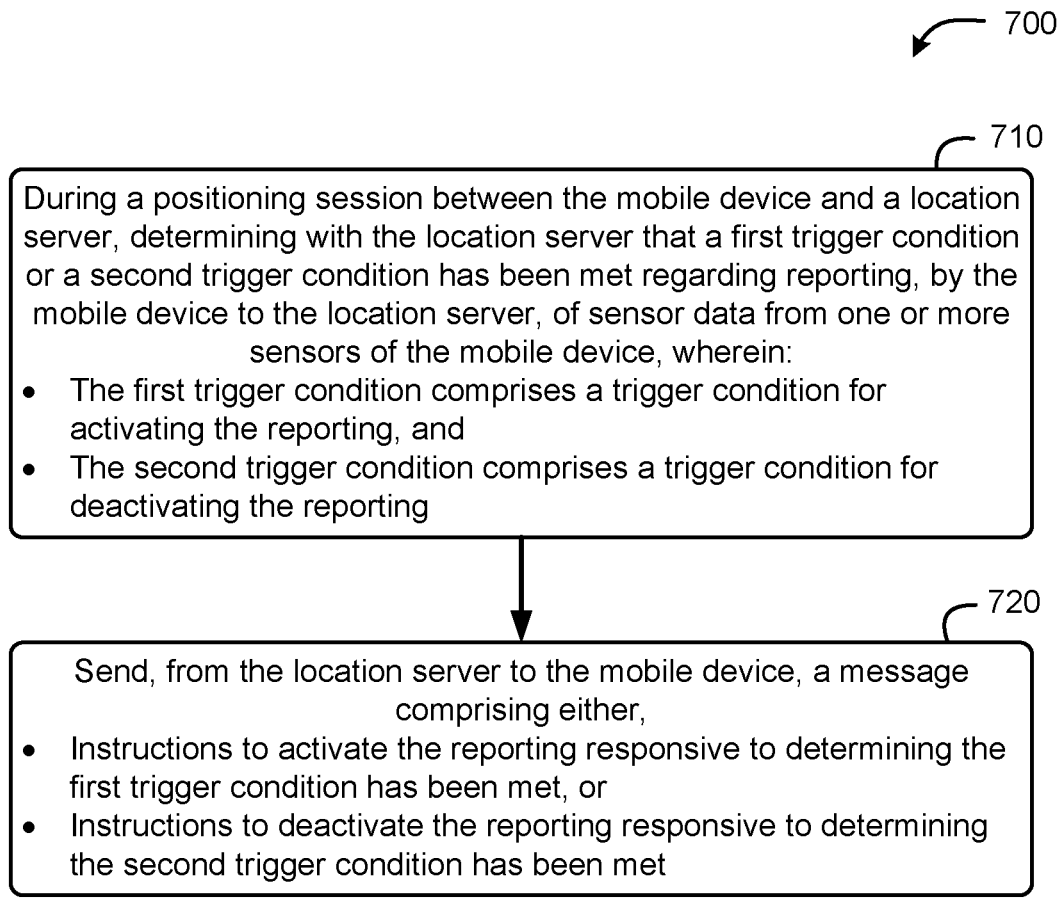
FIG. 7 is a flow diagram of a method of sensor activation or deactivation for positioning a mobile device in a wireless communication network, which may be performed by a location server, according to an embodiment.
Figure 10:
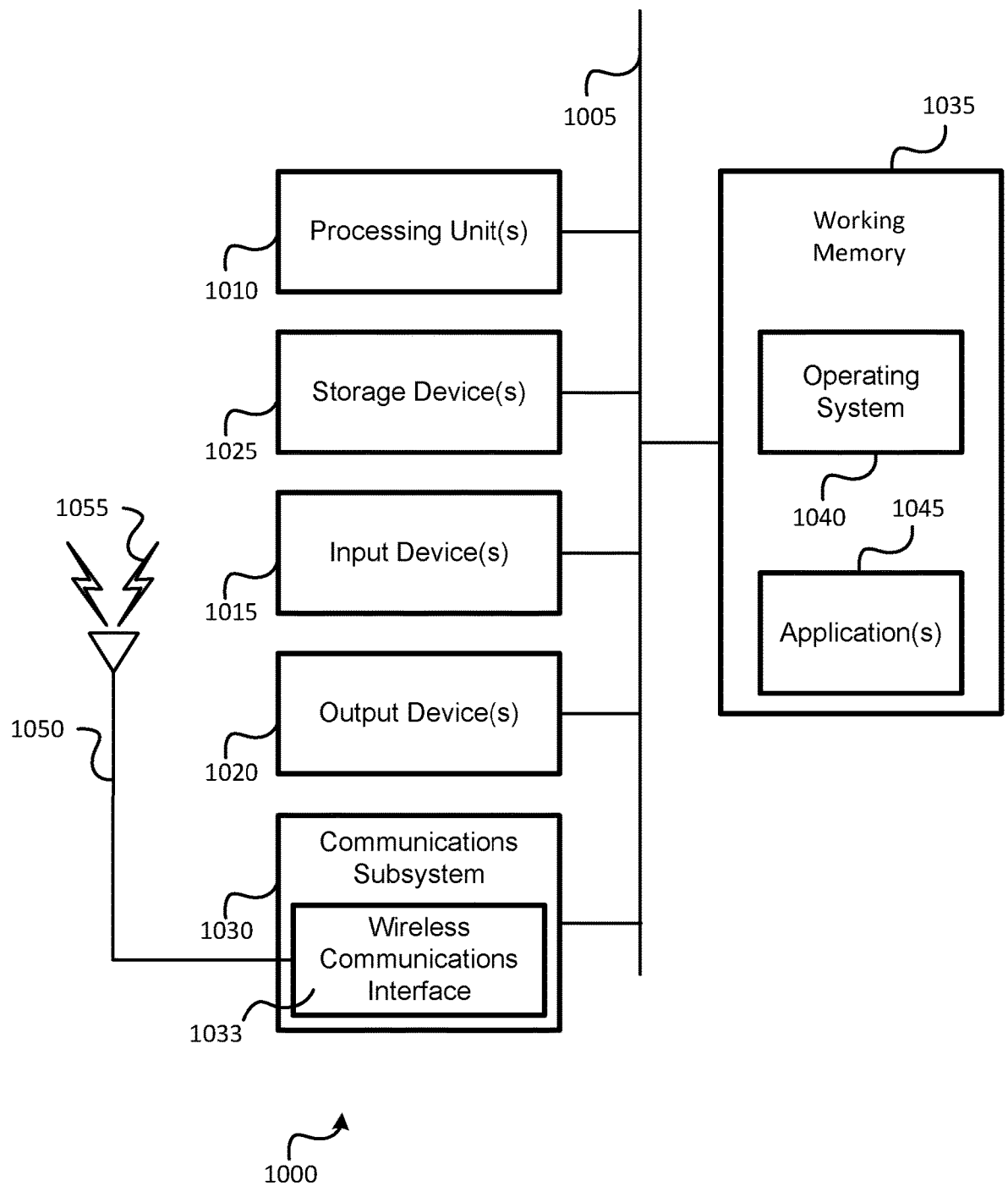
FIG. 10 is a block diagram of an embodiment of a computer system, which can be utilized in embodiments as described herein.

FIG. 7 is a flowchart of an example process 700 of adaptive sensor activation and configuration for positioning. In some implementations, one or more process blocks of FIG. 7 may be performed by a location server (e.g., location server 160). The process 700 may be considered, in some aspects, as an implementation of the functionality illustrated in FIG. 5 and described above. In some embodiments, one or more process blocks of FIG. 7 may be performed by another device or a group of devices separate from or including the location server. A location server may be executed by a computer system, and thus, one or more process blocks of FIG. 7 may be performed by one or more components of a computer system 1000, as illustrated in FIG. 10 and described hereafter.

As shown in FIG. 7, the functionality at process block 710 comprises, during a positioning session between the mobile device and a location server, determining with the location server that a first trigger condition or a second trigger condition has been met regarding reporting, by the mobile device to the location server, of sensor data from one or more sensors of the mobile device, wherein (i) the first trigger condition comprises a trigger condition for activating the reporting, and (ii) the second trigger condition comprises a trigger condition for deactivating the reporting. As noted in the embodiments above, trigger conditions may vary. Thus, according to some embodiments of the process 700, determining the first trigger condition or the second trigger condition may be based at least in part on a position uncertainty of the mobile device exceeding a position uncertainty threshold, a wireless signal quality metric being lower than a signal quality threshold, or a periodicity of non-sensor-based location determinations for the mobile device being lower than a threshold periodicity, or a combination thereof. Embodiments may further comprise obtaining a position determination of the mobile device indicative of the position uncertainty of the mobile device.

Additionally or alternatively, the second trigger condition may be based on information indicative of sensor data being inaccurate. Accordingly, some embodiments of the process 700 may further comprise receiving, at the location server, an indication of an accuracy of sensor data of the one or more sensors of the mobile device, determining, with the location server, an error in the sensor data based at least in part on the indication of an accuracy of sensor data, and determining the second trigger condition has been met based at least in part on the determining the error in the sensor data.

Means for performing the functionality at process block 710 may comprise hardware and/or software components of a computer system, such as the bus 1005, processing unit(s) 1010, communications subsystem 1030, working memory 1035, and/or other components of the computer system 1000 illustrated in FIG. 10 described below.

As further shown in FIG. 7, the functionality at process block 720 comprises sending, from the location server to the mobile device, a message comprising either: instructions to activate the reporting responsive to determining the first trigger condition has been met, or instructions to deactivate the reporting responsive to determining the second trigger condition has been met. As noted in the embodiments above, the message may be sent via RRC, MAC-CE, DCI, or a combination thereof. Is also noted, the activation or deactivation may be specific to a subset of sensors of the mobile device. Accordingly, according to some embodiments, the message further indicates which of one or more sensors of the mobile device to activate responsive to determining the first trigger condition has been met, or the message further indicates which of one or more sensors of the mobile device to deactivate responsive to determining the second trigger condition has been met.

Means for performing the functionality at process block 720 may comprise hardware and/or software components of a computer system, such as the bus 1005, processing unit(s) 1010, communications subsystem 1030, working memory 1035, and/or other components of the computer system 1000 illustrated in FIG. 10 described below.

Figure 8:
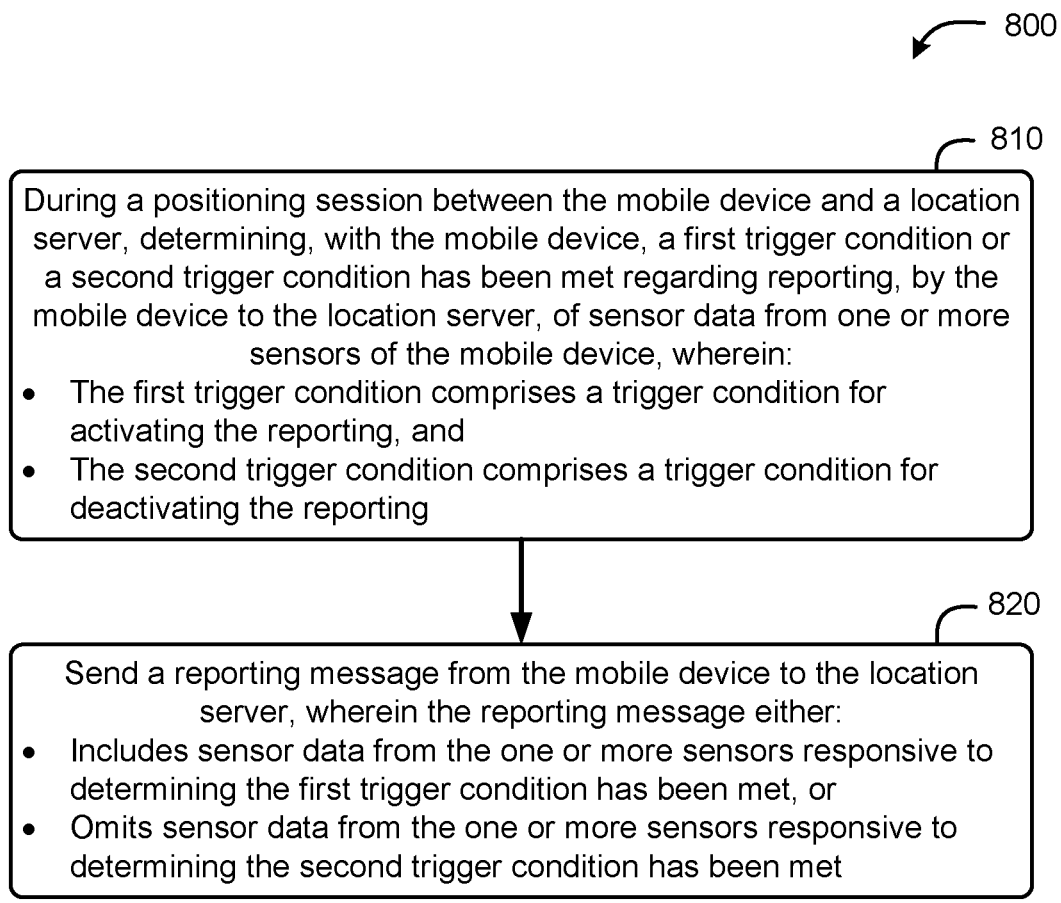
FIG. 8 is a flow diagram of a method of sensor activation or deactivation for positioning a mobile device in a wireless communication network, which may be performed by a mobile device, according to an embodiment.
Figure 9:
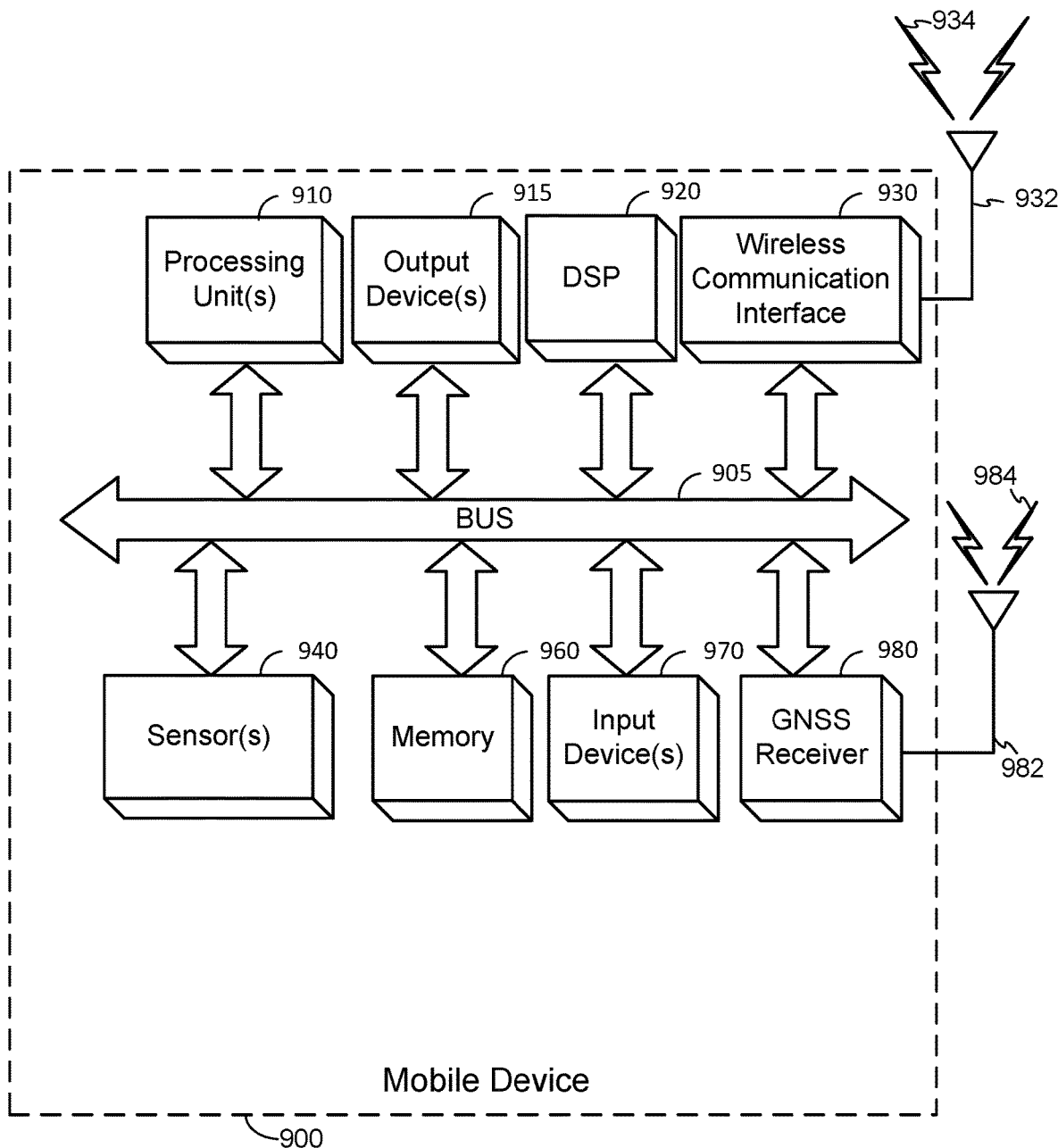
FIG. 9 is a block diagram of an embodiment of a mobile device, which can be utilized in embodiments as described herein.

FIG. 8 is a flowchart of another example process 800 of adaptive sensor activation and configuration for positioning. In some implementations, one or more process blocks of FIG. 8 may be performed by a mobile device (e.g., mobile device 105). The process 700 may be considered, in some aspects, as an implementation of the functionality illustrated in FIG. 6 and described above. Example hardware and/or software components of a mobile device that may be used to perform the functionality of one or more of the process blocks in FIG. 8 are illustrated in FIG. 9 and described hereafter.

As shown in FIG. 8, the functionality at process block 810 comprises, during a positioning session between the mobile device and a location server, determining, with the mobile device, a first trigger condition or a second trigger condition has been met regarding reporting, by the mobile device to the location server, of sensor data from one or more sensors of the mobile device, wherein (i) the first trigger condition comprises a trigger condition for activating the reporting, and (ii) the second trigger condition comprises a trigger condition for deactivating the reporting. According to some embodiments, determining the first trigger condition or the second trigger condition has been met may be based at least in part on a battery power level of the mobile device, a wireless signal quality metric being lower than a signal quality threshold, or a sensor accuracy metric of the one or more sensors of the mobile device being below a sensor accuracy threshold, or a combination thereof. Moreover, the signal quality threshold, the sensor accuracy threshold, or both, may be received by the mobile device in a configuration message from the location server. Further, according to some embodiments, the configuration message is received via RRC, MAC-CE, DCI, for a combination thereof.

Means for performing the functionality at process block 810 may comprise hardware and/or software components of a mobile device, such as the bus 905, processing unit(s) 910, digital signal processor (DSP) 920, the wireless communication interface 930, sensor(s) 940, memory 960, and/or other components of the mobile device 900 illustrated in FIG. 9 described below.

As shown in FIG. 8, the functionality at process block 820 comprises sending a reporting message from the mobile device to the location server, wherein the reporting message either (i) includes sensor data from the one or more sensors responsive to determining the first trigger condition has been met, or (ii) omits sensor data from the one or more sensors responsive to determining the second trigger condition has been met. As noted in the embodiments previously described, some embodiments may include a request/ACK exchange between the mobile device and location server. Accordingly, some embodiments of the process 800 may further include, prior to sending the reporting message, sending a request message from the mobile device to the location server, wherein the request message comprises a request to either (i) activate the reporting responsive to determining the first trigger condition has been met, or (ii) deactivate the reporting responsive to determining the second trigger condition has been met. In such embodiments, the process 800 may further include receiving, at the mobile device, an acknowledgement from the location server, wherein, sending the reporting message is at least partly based on receiving the acknowledgement. As noted, the request may be sent via PUSCH, PUCCH, UCI, or any combination thereof. Moreover, according to some embodiments, either (i) the request to activate the reporting indicates which of one or more sensors of the mobile device to activate, or (ii) the request to deactivate the reporting indicates which of one or more sensors of the mobile device to deactivate.

Means for performing the functionality at process block 820 may comprise hardware and/or software components of a mobile device, such as the bus 905, processing unit(s) 910, DSP 920, the wireless communication interface 930, sensor(s) 940, memory 960, and/or other components of the mobile device 900 illustrated in FIG. 9 described below.

FIG. 9 illustrates an embodiment of a mobile device 900, which can be utilized as described herein above with regard to a UE and/or mobile device (e.g., in association with FIGS. 1-8). For example, the mobile device 900 can perform one or more of the functions of the method shown in FIG. 7. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices. Furthermore, as previously noted, the functionality of the UE discussed in the previously described embodiments may be executed by one or more of the hardware and/or software components illustrated in FIG. 9.

The mobile device 900 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as DSP chips, graphics acceleration processors, application specific integrated circuits (ASICs), and/or the like), and/or other processing structures or means. As shown in FIG. 9, some embodiments may have a separate DSP 920, depending on desired functionality. Location determination and/or other determinations based on wireless communication may be provided in the processing unit(s) 910 and/or wireless communication interface 930 (discussed below). The mobile device 900 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The mobile device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 900 to communicate with other devices as described in the embodiments above. The wireless communication interface 930 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 900 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, Wideband CDMA (WCDMA), and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 900 can further include sensor(s) 940. The sensor(s) 940 may comprise one or more sensors that may be the source of sensor data reporting (e.g., sensor data 335 of FIG. 3). Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), at least some of which may be used to obtain position-related measurements and/or other information for sensor data reporting as described herein.

Embodiments of the mobile device 900 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the mobile device 900, using conventional techniques, from GNSS satellites X110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 910, DSP 920, and/or a processing unit within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 910 or DSP 920.

The mobile device 900 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the mobile device 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the mobile device 900 (and/or processing unit(s) 910 or DSP 920 within mobile device 900). In an aspect, then such code and/or instructions can be used to configure and/or adapt a general-purpose computer (or other device) to perform one or more operations in accordance with the described methods.

FIG. 10 is a block diagram of an embodiment of a computer system 1000, which may be used, in whole or in part, to provide the functions of one or more network components as described in the embodiments herein (e.g., location server 160 and/or LMF 220) it should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different geographical locations.

The computer system 1000 is shown comprising hardware elements that can be electrically coupled via a bus 1005 (or may otherwise be in communication, as appropriate). The hardware elements may include processing unit(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The wireless communication interface 1033 may send and receive wireless signals 1055 (e.g., signals according to 5G NR or LTE) via wireless antenna(s) 1050. Thus the communications subsystem 1030 may comprise a modem, a network card (wireless or wired), an infrared communication device, a wireless communication device, and/or a chipset, and/or the like, which may enable the computer system 1000 to communicate on any or all of the communication networks described herein to any device on the respective network, including a User Equipment (UE), base stations and/or other TRPs, and/or any other electronic devices described herein. Hence, the communications subsystem 1030 may be used to receive and send data as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of sensor activation or deactivation for positioning a mobile device in a wireless communication network, the method comprising: during a positioning session between the mobile device and a location server, determining with the location server that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and sending, from the location server to the mobile device, a message comprising either: instructions to activate the reporting responsive to determining the first trigger condition has been met, or instructions to deactivate the reporting responsive to determining the second trigger condition has been met.

Clause 2. The method of clause 1, wherein determining the first trigger condition or the second trigger condition has been met is based at least in part on: a position uncertainty of the mobile device exceeding a position uncertainty threshold, a wireless signal quality metric being lower than a signal quality threshold, or a periodicity of non-sensor-based location determinations for the mobile device being lower than a threshold periodicity, or a combination thereof.

Clause 3. The method of clause 2, obtaining a position determination of the mobile device indicative of the position uncertainty of the mobile device.

Clause 4. The method of any of clauses 1-3, further comprising: receiving, at the location server, an indication of an accuracy of sensor data of the one or more sensors of the mobile device; determining, with the location server, an error in the sensor data based at least in part on the indication of an accuracy of sensor data; and determining the second trigger condition has been met based at least in part on the determining the error in the sensor data.

Clause 5. The method of any of clauses 1-4, wherein the message is sent via: Radio Resource Control (RRC), Media Access Control—Control Element (MAC-CE), Downlink Control Information (DCI), or a combination thereof.

Clause 6. The method of any of clauses 1-5, wherein: the message further indicates which of one or more sensors of the mobile device to activate responsive to determining the first trigger condition has been met, or the message further indicates which of one or more sensors of the mobile device to deactivate responsive to determining the second trigger condition has been met.

Clause 7. A method of sensor activation or deactivation for positioning a mobile device in a wireless communication network, the method comprising: during a positioning session between the mobile device and a location server, determining, with the mobile device, that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and sending a reporting message from the mobile device to the location server, wherein the reporting message either: includes sensor data from the one or more sensors responsive to determining the first trigger condition has been met, or omits sensor data from the one or more sensors responsive to determining the second trigger condition has been met.

Clause 8. The method of clause 7, further comprising, prior to sending the reporting message: sending a request message from the mobile device to the location server, wherein the request message comprises a request to either: activate the reporting responsive to determining the first trigger condition has been met, or deactivate the reporting responsive to determining the second trigger condition has been met; and receiving, at the mobile device, an acknowledgement from the location server; wherein, sending the reporting message is at least partly based on receiving the acknowledgement.

Clause 9. The method of clause 8, wherein the request message is sent via: Physical Uplink Shared Channel (PUSCH), Physical Uplink Control Channel (PUCCH), Uplink Control Information (UCI), or a combination thereof.

Clause 10. The method of any of clauses 7-9, wherein either: the request to activate the reporting indicates which of one or more sensors of the mobile device to activate, or the request to deactivate the reporting indicates which of one or more sensors of the mobile device to deactivate.

Clause 11. The method of any of clauses 7-10, wherein determining the first trigger condition or the second trigger condition has been met is based at least in part on: a battery power level of the mobile device, a wireless signal quality metric being lower than a signal quality threshold, or a sensor accuracy metric of the one or more sensors of the mobile device being below a sensor accuracy threshold, or a combination thereof.

Clause 12. The method of any of clause 11, wherein the signal quality threshold, the sensor accuracy threshold, or both, are received by the mobile device in a configuration message from the location server.

Clause 13. The method of clause 12, wherein the configuration message is received via: Radio Resource Control (RRC), Media Access Control—Control Element (MAC-CE), Downlink Control Information (DCI), or a combination thereof.

Clause 14. A location server enabling sensor activation or deactivation for positioning a mobile device in a wireless communication network, the location server comprising: a transceiver; a memory; and one or more processing units communicatively coupled with the transceiver and the memory, the one or more processing units configured to: during a positioning session between the mobile device and a location server, determine that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and send, via the transceiver to the mobile device, a message comprising either: instructions to activate the reporting responsive to determining the first trigger condition has been met, or instructions to deactivate the reporting responsive to determining the second trigger condition has been met.

Clause 15. The location server of clause 14, wherein the one or more processing units are configured to determine the first trigger condition or the second trigger condition has been met based at least in part on: a position uncertainty of the mobile device exceeding a position uncertainty threshold, a wireless signal quality metric being lower than a signal quality threshold, or a periodicity of non-sensor-based location determinations for the mobile device being lower than a threshold periodicity, or a combination thereof.

Clause 16. The location server of clause 15, wherein the one or more processing units are further configured to obtain a position determination of the mobile device indicative of the position uncertainty of the mobile device.

Clause 17. The location server of any of clauses 14-16, wherein the one or more processing units are further configured to: receive an indication of an accuracy of sensor data of the one or more sensors of the mobile device; determine an error in the sensor data based at least in part on the indication of an accuracy of sensor data; and determine the second trigger condition has been met based at least in part on the determining the error in the sensor data.

Clause 18. The location server of any of clauses 14-17, wherein the one or more processing units further configured to send the message via: Radio Resource Control (RRC), Media Access Control—Control Element (MAC-CE), Downlink Control Information (DCI), or a combination thereof.

Clause 19. The location server of any of clauses 14-18, wherein the one or more processing units further configured to send the message such that: the message further indicates which of one or more sensors of the mobile device to activate responsive to determining the first trigger condition has been met, or the message further indicates which of one or more sensors of the mobile device to deactivate responsive to determining the second trigger condition has been met.

Clause 20. A mobile device enabling sensor activation or deactivation for positioning a mobile device in a wireless communication network, the mobile device comprising: a wireless transceiver; a memory; and one or more processing units communicatively coupled with the wireless transceiver and the memory, the one or more processing units configured to: during a positioning session between the mobile device and a location server, determine that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and send a reporting message via the wireless transceiver to the location server, wherein the reporting message either: includes sensor data from the one or more sensors responsive to determining the first trigger condition has been met, or omits sensor data from the one or more sensors responsive to determining the second trigger condition has been met.

Clause 21. The mobile device of clause 20, wherein the one or more processing units are configured to, prior to sending the reporting message: send a request message via the wireless transceiver to the location server, wherein the request message comprises a request to either: activate the reporting responsive to determining the first trigger condition has been met, or deactivate the reporting responsive to determining the second trigger condition has been met; and receive, via the wireless transceiver, an acknowledgement from the location server; wherein, the one or more processing units are configured to send the reporting message at least partly based on receiving the acknowledgement.

Clause 22. The mobile device of clause 21, wherein the one or more processing units are configured to send the request via: Physical Uplink Shared Channel (PUSCH), Physical Uplink Control Channel (PUCCH), Uplink Control Information (UCI), or a combination thereof.

Clause 23. The mobile device of any of clauses 20-22, wherein the one or more processing units are configured to either: indicate, in the request to activate the reporting, which of one or more sensors of the mobile device to activate, or indicate, in the request to deactivate the reporting, which of one or more sensors of the mobile device to deactivate.

Clause 24. The mobile device of any of clauses 20-23, wherein the one or more processing units are configured to determine the first trigger condition or the second trigger condition has been met based at least in part on: a battery power level of the mobile device, a wireless signal quality metric being lower than a signal quality threshold, or a sensor accuracy metric of the one or more sensors of the mobile device being below a sensor accuracy threshold, or a combination thereof.

Clause 25. The mobile device of any of clauses 24-24, wherein the one or more processing units are configured to receive the signal quality threshold, the sensor accuracy threshold, or both, via the wireless transceiver in a configuration message from the location server.

Clause 26. The mobile device of clause 25, wherein the one or more processing units are configured to receive the configuration message via: Radio Resource Control (RRC), Media Access Control—Control Element (MAC-CE), Downlink Control Information (DCI), or a combination thereof.

Clause 27. A device for sensor activation or deactivation for positioning a mobile device in a wireless communication network, the device comprising: means for determining, during a positioning session between the mobile device and a location server, that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and means for sending, to the mobile device, a message comprising either: instructions to activate the reporting responsive to determining the first trigger condition has been met, or instructions to deactivate the reporting responsive to determining the second trigger condition has been met.

Clause 28. The device of clause 27, wherein the means for determining the first trigger condition or the second trigger condition has been met are configured to base the determining at least in part on: a position uncertainty of the mobile device exceeding a position uncertainty threshold, a wireless signal quality metric being lower than a signal quality threshold, or a periodicity of non-sensor-based location determinations for the mobile device being lower than a threshold periodicity, or a combination thereof.

Clause 29. The device of any of clauses 28 further comprising-28, means for obtaining a position determination of the mobile device indicative of the position uncertainty of the mobile device.

Clause 30. The device of any of clauses 27-29, further comprising: means for receiving, at the location server, an indication of an accuracy of sensor data of the one or more sensors of the mobile device; means for determining, with the location server, an error in the sensor data based at least in part on the indication of an accuracy of sensor data; and means for determining the second trigger condition has been met based at least in part on the determining the error in the sensor data.

Clause 31. The device of any of clauses 27-30, wherein the means for sending the message comprise means for sending the message via: Radio Resource Control (RRC), Media Access Control—Control Element (MAC-CE), Downlink Control Information (DCI), or a combination thereof.

Clause 32. The device of any of clauses 27-31, wherein the means for sending further comprise means for including, in the message: an indication of which of one or more sensors of the mobile device to activate responsive to determining the first trigger condition has been met, or an indication of which of one or more sensors of the mobile device to deactivate responsive to determining the second trigger condition has been met.

Clause 33. A device of sensor activation or deactivation for positioning a mobile device in a wireless communication network, the device comprising: means for determining, during a positioning session between the mobile device and a location server, that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and means for sending a reporting message to the location server, wherein the reporting message either: includes sensor data from the one or more sensors responsive to determining the first trigger condition has been met, or omits sensor data from the one or more sensors responsive to determining the second trigger condition has been met.

Clause 34. The device of clause 33, further comprising: means for sending, prior to sending the reporting message, a request message to the location server, wherein the request message comprises a request to either: activate the reporting responsive to determining the first trigger condition has been met, or deactivate the reporting responsive to determining the second trigger condition has been met; and means for receiving an acknowledgement of the request from the location server; wherein, sending the reporting message is at least partly based on receiving the acknowledgement.

Clause 35. The device of clause 34, wherein the means for sending the request comprise means for sending the request via: Physical Uplink Shared Channel (PUSCH), Physical Uplink Control Channel (PUCCH), Uplink Control Information (UCI), or a combination thereof.

Clause 36. The device of any of clauses 33-35, wherein the means for sending the request comprise means for including, in the request, either: an indication, in the request to activate the reporting, of which of one or more sensors of the mobile device to activate, or an indication, in the request to deactivate the reporting, of which of one or more sensors of the mobile device to deactivate.

Clause 37. The device of any of clauses 33-36, wherein the means for determining the first trigger condition or the second trigger condition has been met comprise means for basing the determination at least in part on: a battery power level of the mobile device, a wireless signal quality metric being lower than a signal quality threshold, or a sensor accuracy metric of the one or more sensors of the mobile device being below a sensor accuracy threshold, or a combination thereof.

Clause 38. The device of clause 37 further comprising means for receiving the signal quality threshold, the sensor accuracy threshold, or both, in a configuration message from the location server.

Clause 39. The device of any of clauses 38 further comprising-38, means for receiving the configuration message via: Radio Resource Control (RRC), Media Access Control—Control Element (MAC-CE), Downlink Control Information (DCI), or a combination thereof.

Clause 40. A non-transitory computer-readable medium storing instructions for sensor activation or deactivation for positioning a mobile device in a wireless communication network, the instructions comprising code for: determining, during a positioning session between the mobile device and a location server, that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and sending, from the location server to the mobile device, a message comprising either: instructions to activate the reporting responsive to determining the first trigger condition has been met, or instructions to deactivate the reporting responsive to determining the second trigger condition has been met.

Clause 41. The non-transitory computer-readable medium of clause 40, wherein the code for determining the first trigger condition or the second trigger condition has been met comprises code for basing the determination at least in part on: a position uncertainty of the mobile device exceeding a position uncertainty threshold, a wireless signal quality metric being lower than a signal quality threshold, or a periodicity of non-sensor-based location determinations for the mobile device being lower than a threshold periodicity, or a combination thereof.

Clause 42. The non-transitory computer-readable medium of clause 41, wherein the instructions further comprise code for obtaining a position determination of the mobile device indicative of the position uncertainty of the mobile device.

Clause 43. The non-transitory computer-readable medium of any of clauses 40-42, wherein the instructions further comprise code for: receiving, at the location server, an indication of an accuracy of sensor data of the one or more sensors of the mobile device; determining, with the location server, an error in the sensor data based at least in part on the indication of an accuracy of sensor data; and determining the second trigger condition has been met based at least in part on the determining the error in the sensor data.

Clause 44. The non-transitory computer-readable medium of any of clauses 40-43, wherein the code for sending the message includes code for sending the message via: Radio Resource Control (RRC), Media Access Control—Control Element (MAC-CE), Downlink Control Information (DCI), or a combination thereof.

Clause 45. The non-transitory computer-readable medium of any of clauses 40-44, wherein the code for sending the message includes code for including, in the message: an indication of which of one or more sensors of the mobile device to activate responsive to determining the first trigger condition has been met, or an indication of which of one or more sensors of the mobile device to deactivate responsive to determining the second trigger condition has been met.

Clause 46. A non-transitory computer-readable medium storing instructions for sensor activation or deactivation for positioning a mobile device in a wireless communication network, the instructions comprising code for: determining, during a positioning session between the mobile device and a location server, that a first trigger condition or a second trigger condition has been met regarding reporting, by the mobile device to the location server, of sensor data from one or more sensors of the mobile device, wherein: the first trigger condition comprises a trigger condition for activating the reporting, and the second trigger condition comprises a trigger condition for deactivating the reporting; and sending a reporting message from the mobile device to the location server, wherein the reporting message either: includes sensor data from the one or more sensors responsive to determining the first trigger condition has been met, or omits sensor data from the one or more sensors responsive to determining the second trigger condition has been met.

Clause 47. The non-transitory computer-readable medium of clause 46, wherein the instructions further comprise code for: prior to sending the reporting message, sending a request message from the mobile device to the location server, wherein the request message comprises a request to either: activate the reporting responsive to determining the first trigger condition has been met, or deactivate the reporting responsive to determining the second trigger condition has been met; and receiving an acknowledgement from the location server; wherein, sending the reporting message is at least partly based on receiving the acknowledgement.

Clause 48. The non-transitory computer-readable medium of clause 47, wherein the code for sending the request comprises code for sending the request via: Physical Uplink Shared Channel (PUSCH), Physical Uplink Control Channel (PUCCH), Uplink Control Information (UCI), or a combination thereof.

Clause 49. The non-transitory computer-readable medium of any of clauses 46-48, wherein the code for sending the request comprises code for either: including, in the request to activate the reporting, an indication of which of one or more sensors of the mobile device to activate, or including, in the request to deactivate the reporting, an indication of which of one or more sensors of the mobile device to deactivate.

Clause 50. The non-transitory computer-readable medium of any of clauses 46-49, wherein the code for determining the first trigger condition or the second trigger condition has been met comprises code for basing the determination at least in part on: a battery power level of the mobile device, a wireless signal quality metric being lower than a signal quality threshold, or a sensor accuracy metric of the one or more sensors of the mobile device being below a sensor accuracy threshold, or a combination thereof.

Clause 51. The non-transitory computer-readable medium of clause 50 further comprising code for receiving the signal quality threshold, the sensor accuracy threshold, or both, in a configuration message from the location server.

Clause 52. The non-transitory computer-readable medium of clause 51, wherein the code for receiving the configuration message comprises code for receiving the configuration message via: Radio Resource Control (RRC), Media Access Control—Control Element (MAC-CE), Downlink Control Information (DCI), or a combination thereof.

What is claimed is:

1. A method of sensor deactivation for positioning a mobile device in a wireless communication network, the method comprising:
    during a Long Term Evolution (LTE) Positioning Protocol (LPP) positioning session between the mobile device and a location server:
        receiving in a first LPP message, combined location information at the location server from the mobile device for which sensor data reporting has been activated, wherein the combined location information includes sensor data from one or more sensors of the mobile device and measured position information;
        determining with the location server that a trigger condition has been met for deactivating the sensor data reporting;
        responsive to determining the trigger condition has been met, sending, from the location server to the mobile device, a deactivation message comprising instructions to deactivate the sensor data reporting; and
        subsequent to deactivating the sensor data reporting, receiving location information at the location server in a second LPP message from the mobile device not including sensor data from the one or more sensors of the mobile device.

2. The method of claim 1, wherein determining that the trigger condition has been met is based at least in part on:
    a position uncertainty of the mobile device exceeding a position uncertainty threshold,
    a wireless signal quality metric being lower than a signal quality threshold,
    a periodicity of non-sensor-based location determinations for the mobile device being lower than a threshold periodicity, or
    a combination thereof.

3. The method of claim 2, further comprising obtaining a position determination of the mobile device indicative of the position uncertainty of the mobile device.

4. The method of claim 1, further comprising:
    receiving, at the location server, an indication of an accuracy of the sensor data of the one or more sensors of the mobile device; and
    determining, with the location server, an error in the sensor data based at least in part on the indication of an accuracy of sensor data;
    wherein determining the trigger condition has been met is based at least in part on the determining the error in the sensor data.

5. The method of claim 1, wherein the deactivation message is sent via:
    Radio Resource Control (RRC),
    Media Access Control-Control Element (MAC-CE),
    Downlink Control Information (DCI), or
    a combination thereof.

6. The method of claim 1, wherein the deactivation message further indicates which of one or more sensors of the mobile device to deactivate responsive to determining the trigger condition has been met.

7. A method of sensor deactivation for positioning a mobile device in a wireless communication network, the method comprising:
    during a Long Term Evolution (LTE) Positioning Protocol (LPP) positioning session between the mobile device and a location server:
        sending, in a first LPP message from the mobile device for which sensor data reporting has been activated, combined location information to the location server, wherein the combined first location information includes sensor data from one or more sensors of the mobile device and measured position information;
        determining, with the mobile device, that a trigger condition has been met for deactivating the sensor data reporting; and
        responsive to determining the trigger condition has been met, sending location information in a second LPP message from the mobile device to the location server not including sensor data from the one or more sensors of the mobile device.

8. The method of claim 7, further comprising, prior to sending the second LPP message:
    sending a request message from the mobile device to the location server, wherein the request message comprises a request to deactivate the reporting responsive to determining the trigger condition has been met; and
    receiving, at the mobile device, an acknowledgement from the location server;
    wherein, sending the second LPP message is at least partly based on receiving the acknowledgement.

9. The method of claim 8, wherein the request message is sent via:
    Physical Uplink Shared Channel (PUSCH),
    Physical Uplink Control Channel (PUCCH),
    Uplink Control Information (UCI), or
    a combination thereof.

10. The method of claim 8, wherein the request to deactivate the reporting indicates which of one or more sensors of the mobile device to deactivate.

11. The method of claim 7, wherein determining the trigger condition has been met is based at least in part on:
    a battery power level of the mobile device,
    a wireless signal quality metric being lower than a signal quality threshold,
    a sensor accuracy metric of the one or more sensors of the mobile device being below a sensor accuracy threshold, or
    a combination thereof.

12. The method of claim 11, wherein the signal quality threshold, the sensor accuracy threshold, or both, are received by the mobile device in a configuration message from the location server.

13. The method of claim 12, wherein the configuration message is received via:

Radio Resource Control (RRC),
Media Access Control-Control Element (MAC-CE),
Downlink Control Information (DCI), or
a combination thereof.

14. A location server enabling sensor deactivation for positioning a mobile device in a wireless communication network, the location server comprising:
  at least one transceiver;
  a memory; and
  one or more processing units communicatively coupled with the at least one transceiver and the memory, the one or more processing units configured to:
  during a Long Term Evolution (LTE) Positioning Protocol (LPP) positioning session between the mobile device and a location server:
    receive, in a first LPP message received via the at least one transceiver, combined location information from the mobile device for which sensor data reporting has been activated, wherein the combined first location information includes sensor data from one or more sensors of the mobile device and measured position information;
    determine that a trigger condition has been met regarding for deactivating the reporting;
    responsive to determining the trigger condition has been met, send, via the at least one transceiver to the mobile device, a deactivation message comprising instructions to deactivate the sensor data reporting; and
    subsequent to deactivating the sensor data reporting, receive location information at the location server in a second LPP message from the mobile device not including sensor data from the one or more sensors of the mobile device.

15. The location server of claim 14, wherein the one or more processing units are configured to determine that the trigger condition has been met based at least in part on:
  a position uncertainty of the mobile device exceeding a position uncertainty threshold,
  a wireless signal quality metric being lower than a signal quality threshold,
  a periodicity of non-sensor-based location determinations for the mobile device being lower than a threshold periodicity, or
  a combination thereof.

16. The location server of claim 15, wherein the one or more processing units are further configured to obtain a position determination of the mobile device indicative of the position uncertainty of the mobile device.

17. The location server of claim 14, wherein the one or more processing units are further configured to:
  receive an indication of an accuracy of the sensor data of the one or more sensors of the mobile device;
  determine an error in the sensor data based at least in part on the indication of an accuracy of sensor data; and
  make the determination that the trigger condition has been met based at least in part on the determining the error in the sensor data.

18. The location server of claim 14, wherein the one or more processing units further configured to send the deactivation message via:
  Radio Resource Control (RRC),
  Media Access Control-Control Element (MAC-CE),
  Downlink Control Information (DCI), or
  a combination thereof.

19. The location server of claim 14, wherein the one or more processing units further configured to send the deactivation message such that the deactivation message further indicates which of one or more sensors of the mobile device to deactivate responsive to determining the trigger condition has been met.

20. A mobile device enabling sensor deactivation for positioning a mobile device in a wireless communication network, the mobile device comprising:
  at least one transceiver;
  a memory; and
  one or more processing units communicatively coupled with the at least one transceiver and the memory, the one or more processing units configured to:
  during a Long Term Evolution (LTE) Positioning Protocol (LPP) positioning session between the mobile device and a location server:
    send, in a first LPP message via the at least one transceiver while sensor data reporting has been activated for the mobile device, combined location information to the location server, wherein the combined location information includes sensor data from one or more sensors of the mobile device and measured position information;
    determine that a trigger condition has been met for deactivating the sensor data reporting; and
    responsive to determining the trigger condition has been met, send location information in a second LPP message via the at least one transceiver to the location server not including sensor data from the one or more sensors of the mobile device.

21. The mobile device of claim 20, wherein the one or more processing units are configured to, prior to sending the second LPP message:
  send a request message via the at least one transceiver to the location server, wherein the request message comprises a request to deactivate the reporting responsive to determining the trigger condition has been met; and
  receive, via the at least one transceiver, an acknowledgement from the location server;
  wherein, the one or more processing units are configured to send the second LPP message at least partly based on receiving the acknowledgement.

22. The mobile device of claim 21, wherein the one or more processing units are configured to send the request message via:
  Physical Uplink Shared Channel (PUSCH),
  Physical Uplink Control Channel (PUCCH),
  Uplink Control Information (UCI), or
  a combination thereof.

23. The mobile device of claim 21, wherein the one or more processing units are configured to indicate, in the request message to deactivate the reporting, which of one or more sensors of the mobile device to deactivate.

24. The mobile device of claim 20, wherein the one or more processing units are configured to determine the trigger condition has been met based at least in part on:
  a battery power level of the mobile device,
  a wireless signal quality metric being lower than a signal quality threshold,
  a sensor accuracy metric of the one or more sensors of the mobile device being below a sensor accuracy threshold, or
  a combination thereof.

25. The mobile device of claim 24, wherein the one or more processing units are configured to receive the signal quality threshold, the sensor accuracy threshold, or both, via the at least one transceiver in a configuration message from the location server.

26. The mobile device of claim 25, wherein the one or more processing units are configured to receive the configuration message via:
 Radio Resource Control (RRC),
 Media Access Control-Control Element (MAC-CE),
 Downlink Control Information (DCI), or
 a combination thereof.

\* \* \* \* \*